United States Patent Office 3,384,603
Patented May 21, 1968

3,384,603
PROCESS FOR PRODUCTION OF POLYMERS
OF PROPYLENE OXIDE
Gunther Elfers, Grosse Ile, Mich., assignor to Wyandotte
Chemicals Corporation, Wyandotte, Mich., a corporation of Michigan
No Drawing. Filed Oct. 2, 1964, Ser. No. 401,216
6 Claims. (Cl. 260—2)

ABSTRACT OF THE DISCLOSURE

High molecular weight propylene oxide polymers and copolymers characterized by at least 50% crystallinity are prepared employing a catalyst system comprising (a) a dialkyl or diaryl zinc, (b) an aluminum alkoxide, and (c) water. The polymer and copolymer so prepared have rubber-like properties and upon curing result in ozone and oil resistant elastomers.

This invention relates to a process for the preparation of high molecular weight, high isotactic polymers and copolymers of propylene oxide. More particularly, this invention relates to a process for the preparation of high isotactic polymers by contacting propylene oxide with a novel catalyst system.

The preparation of polymers and copolymers of propylene oxide is known in the art. In fact, numerous catalyst systems have been proposed for utilization in the subject polymerization process. For example, a publication in Makromol. Chem., 40, pp. 64–78, 1960, shows the use of diethyl zinc and water as a catalyst for the polymerization of propylene oxide. Also, a publication in J. Polymer Sci., 48, pp. 273–8, 1960, shows the use of aluminum trimethyl and water as an effective catalyst for the polymerization of propylene oxide. Furthermore, references teach the use of a combination of a zinc compound and an aluminum compound as catalysts in the subject polymerization process. Although all of these catalysts may be utilized in the preparation of polymers and copolymers of propylene oxide, none result in high yields of high molecular weight, high isotactic products.

Now, in accordance with this invention, a new process for the preparation of polymers and copolymers of propylene oxide has been found which results in excellent yields of high molecular weight, high isotactic polymers. This process comprises contacting propylene oxide for a sufficient period of time to polymerize the monomer with a catalyst system comprising (a) a compound of the formula: $ZnR_2$ wherein R is selected from the group consisting of alkyl and aryl; (b) a compound of the formula: $Al(OR')_3$ wherein R' is alkyl, and (c) water. As used in accordance with this invention, high isotactic polymers and copolymers includes those compounds which demonstrate at least 50 percent crystallinity as determined from precipitation from cold acetone, as explained more fully hereinafter. Also, as used in accordance with this invention, high molecular weight polymers and copolymers include those compounds that have a molecular weight of at least 100,000, preferably 300,000 to 5,000,00 or more.

In view of the closeness of the catalyst system of this invention to that of the art, it is surprising that such marked differences in products can be obtained when using this novel catalyst system. It was totally unobvious and unexpected that high isotactic, high molecular weight compounds could be prepared in such quantitative yields.

Three essential components comprise the catalyst system of this invention. One component is a compound of the formula: $ZnR_2$ wherein R is selected from the group consisting of alkyl having from 1–4 carbon atoms and aryl having six carbon atoms in aryl nucleus. Exemplary compounds include zinc dimethyl, zinc diethyl, zinc diisopropyl, zinc di-n-butyl, zinc diisobutyl, zinc diphenyl, zinc dibenzyl, and mixtures of any of the above.

Another component of the catalyst system of this invention is a compound of the formula: $Al(OR')_3$ wherein R' is alkyl having from 1–4 carbon atoms. Representative compounds include aluminum methoxide, aluminum ethoxide, aluminum isopropoxide, aluminum-n-propoxide, aluminum n-butoxide, and mixtures of any of the above.

The third component of the catalyst system of this invention is water. The water reacts with the other two components to form a complex catalyst system. The exact mechanism involved is not known. Other active hydrogen compounds such as alcohols and amines have been substituted for water as the third component of the catalyst system. Polymerization occurred but the products were not as isotactic as obtainable utilizing water. Moreover, good yields of high molecular weight polymers were not obtained.

Each of the three components of the catalyst system of this invention may be employed in amounts of from about 0.05 to about five mol percent, preferably from about 0.25 to about 1.5 mol percent, based on the starting monomer(s). Thus, the total catalyst present may be from about 0.15 to about fifteen mol percent, based on the starting monomer(s) containing an oxirane ring and being free of interfering functional groups.

Numerous epoxy monomers may be copolymerized with propylene oxide according to this invention. Representative monomers include ethylene oxide, 1,2-butylene oxide, 2,3-butylene oxide, 1,2-dodecylene oxide, styrene oxide, epichlorohydrin, 1,1,1-trichloropropylene oxide, butadiene monoxide, vinyl cyclohexene oxide, glycidyl acrylates, allyl glycidyl ether, and glycidyl sorbates. Terpolymers may also be prepared by selecting two monomers to copolymerize with propylene oxide. In preparing copolymers, up to about an equal mol proportion of the epoxy monomer may be used.

The polymerization may be carried out in the presence of an inert solvent. Representative solvents include aromatic hydrocarbons such as benzene, toluene, and xylene; aliphatic hydrocarbons such as octane, n-hexane, and n-heptane; chlorinated hydrocarbons such as carbon tetrachloride, ethylene dichloride, and ethers such as tetrahydrofuran, dimethylsulfoxide, and ethyl ether. It is also possible to carry out the polymerization reaction in the absence of an inert solvent if it is so desired. However, use of a solvent will facilitate handling the catalyst. Various amounts of solvent are suitable; the exact amount utilized will primarily depend on the particular monomers selected, the particular catalyst selected, and the amounts thereof.

The temperature at which the reaction is carried out may be from about 0° to 200° C. Usually, temperatures of from about 50° C. to 150° C. are employed.

The pressure under which the reaction is conducted is from about atmospheric to about 40 atmospheres, preferably between one and ten atmospheres. Since the polymerization reaction occurs in the liquid phase, sufficient pressure is employed to keep the alkylene oxide compounds in liquid condition regardless of whether an inert solvent is present in the reaction mixture or not.

The reaction time will usually be from a few hours to several days, depending on the reaction conditions such as pressure, temperture, catalyst activity and catalyst concentrations. In addition to the choice of catalyst, temperature and pressure may be varied to serve as means of controlling the molecular weight of the resulting polymer. Reaction conditions are largely determined by the nature of the polymerization catalyst and the starting material and by the properties desired in the product.

The process of the present invention is suitably carried out in an autoclave provided with a means for stirring the reaction mixture. The autoclave is preferably purged with inert gas (e.g. nitrogen) prior to carrying out the polymerization. The monomeric compound may be generally added to the catalyst or to a solution of the catalyst in a solvent or the addition may be in the reverse order if desired. The mixture is allowed to reach, or if necessary is heated to, the desired reaction temperature at which it is maintained for the required time, usually with constant or intermittent stirring. In some cases external cooling may be necessary to remove excess heat of reaction, especially in the initial stages. The reaction is exothermic, but the reaction mixture can, if necessary, be heated to insure completion of reaction. It is also possible to carry out the polymerization continuously if so desired. The standard changes in the above-described batch process will, of course, be necessary, to carry out this process continuously.

The following examples serve to illustrate this invention. All parts are by weight, unless otherwise stated.

Example I

A reaction vessel, equipped with a means for stiring and a heat exchange means, was flushed with nitrogen and charged with 116 parts of propylene oxide, 2.7 parts (0.75 mol percent) zinc di-n-butyl, 2.04 parts (0.5 mol percent) aluminium isopropoxide, 0.09 part (0.25 mol percent) water, and 112 parts of benzene. The reaction mixture was heated to about 65° C. and maintained there for about 72 hours. The benzene was then removed from the reaction mixture by evaporation under vacuum. One hundred thirteen parts (94 percent of theory) of a white, rubbery solid was obtained.

The molecular weight of the polymer was 5,400,000 based on the intrinsic viscosity which was determined as described by W. R. Sorenson and T. W. Campbell, Preparative Methods of Polymer Chemistry, p. 41, 1961. The isotacticity of this polymer was calculated by precipitation from cold acetone as described by M. Osgen and C. Price (University of Pennsylvania) in J. Polymer Sci., 34, pp. 153–6, 1959. This calculation indicates that the polymer was 62 percent isotactic.

Example II

A copolymer of propylene oxide and glycidyl allyl ether was prepared by charging to a reaction vessel 110 parts propylene oxide, 11.4 parts (5 mol percent) glycidyl allyl ether, 2.7 parts (0.75 mol percent) zinc di-n-butyl, 2.04 parts (0.5 mol percent) aluminum isopropoxide, 0.18 part (0.5 mol percent) water, and 112 parts benzene. Heating for 64 hours at 65° C. resulted, after removal of the benzene, in 117 parts (93 percent of theory) of a rubbery, white solid.

The product had a molecular weight of 1,500,000 on the basis of intrinsic viscosity and demonstrated 65 percent isotacticity by precipitation from cold acetone. In calculating the molecular weight of the polymer, the same intrinsic viscosity molecular weight relationship was used as for 100 percent polypropylene oxide.

Example III

Several polymerizations were carried out in which various catalyst systems in varying amounts were utilized. The general procedure of Example I was followed. The monomers and catalyst systems utilized are shown in Table 1.

TABLE 1

| Monomer(s) | Catalyst System | | | | | Mol. Wt., $M_V$ | Product, Percent Isotactic |
|---|---|---|---|---|---|---|---|
| | Al Compound | Amt., Mol percent | Zn Compound | Amt., mol percent | $H_2O$ Amt., mol percent | | |
| III. Propylene Oxide (97 mol percent), Butadiene Monoxide (3 mol percent). | Isopropoxide | 0.5 | Di-n-butyl | 0.75 | 0.5 | [1] 750,000 | >60 |
| IV. Propylene Oxide | do | 0.5 | do | 0.5 | 0.25 | 2,700,000 | >60 |
| V. Propylene Oxide | do | 0.5 | do | 0.75 | 0.5 | 1,900,000 | >60 |
| VI. Propylene Oxide | do | 1.0 | Diethyl | 1.0 | 2.0 | 246,700 | >60 |
| VII. Propylene Oxide (75 mol percent), 1,2-Butylene Oxide (25 mol percent). | do | 0.5 | Di-n-butyl | 0.5 | 0.5 | [1] 750,000 | >60 |
| VIII. Propylene Oxide (75 mol percent), 2,3-Butylene Oxide (25 mol percent). | do | 0.5 | do | 0.75 | 0.25 | [1] 750,000 | >60 |
| IX. Propylene Oxide (65 mol percent), Ethylene Oxide (30 mol percent), Allyl Glycidyl Ether (5 mol percent). | do | 0.5 | do | 0.75 | 0.5 | [1] 1,500,000 | >50 |

[1] The same intrinsic viscosity-molecular weihgt relationship was used as for 100 percent polypropylene oxide.

The polymers and copolymers of this invention have rubberlike properties and upon compounding on a rubber mill and press curing, strong ozone and oil resistant elastomers with superior low temperature properties may be obtained. Known curing and compounding agents may be employed. Also, the high molecular weight polymers of this invention may be formed into films and may be used as intermediates in several other industries.

I claim:

1. A process for the preparation of propylene oxide polymers and copolymers having a molecular weight of at least 100,000 and characterized by at least 50% crystallinity comprising contracting propylene oxide or a mixture of propylene oxide and another epoxy compound containing and oxirane ring and being free of interfering functional groups, at a temperature between 0° C. and 200° C. with a catalyst system consisting essentially of (a) from 0.05 to 5 mole percent of a compound of the formula: $ZnR_2$ where R is selected from the group consisting of alkyl having from 1-4 carbon atoms and aryl having six carbon atoms in the aryl nucleus, (b) from 0.05 to 5 mole percent of a compound of the formula: Al (OR')$_3$ wherein R' is alkyl having from 1–4 carbon atoms, and (c) from 0.05 to 5 mole percent of water, said mole percents based on the starting oxide.

2. The process of claim 1 where in ZnR$_2$ is zinc di-n-butyl.

3. The process of claim 1 where ZnR$_2$ is zinc diethyl.

4. The process of claim 1 wherein Al (OR')$_3$ is aluminum isopropoxide.

5. The process of claim 1 wherein ZnR$_2$ is zinc di-n-butyl and Al (OR')$_3$ is aluminum isopropoxide.

6. The process of claim 1 wherein the epoxy compound is selected from the group consisting of ethylene oxide, 1, 2-butylene oxide, butadiene monoxide, and glycidyl allyl ether.

References Cited

FOREIGN PATENTS

| | | |
|---|---|---|
| 623,510 | 6/1963 | Belgium. |
| 927,817 | 6/1963 | Great Britain. |

OTHER REFERENCES

"Chemical Abstracts," vol. 59, November 1963 (p. 11684g relied on). Copy in G120 library.

WILLIAM H. SHORT, *Primary Examiner.*

T. PERTILLA, *Assistant Examiner.*